No. 761,116. PATENTED MAY 31, 1904.
C. G. WALLACE.
TRACE CARRIER.
APPLICATION FILED FEB. 9, 1903.
NO MODEL.
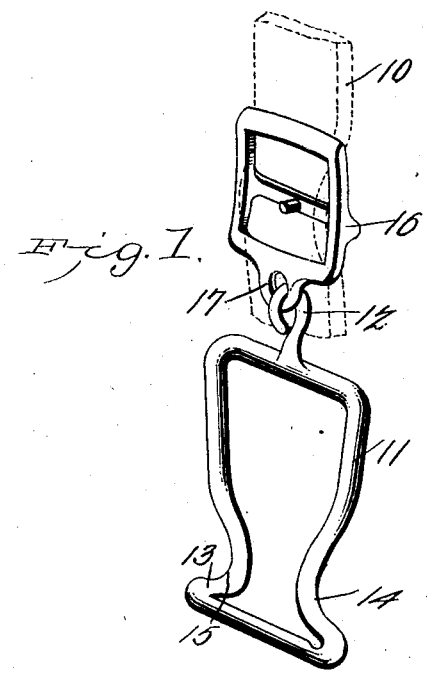
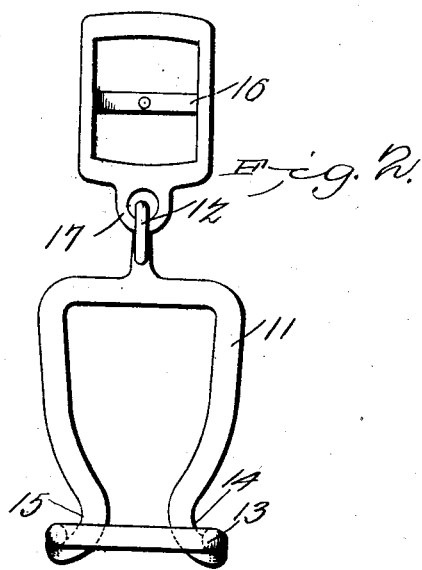
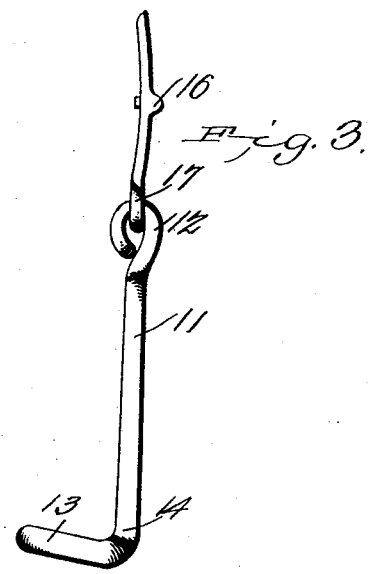
Witnesses
E. F. Stewart
C. N. Woodward
C. G. Wallace, Inventor.
by C. A. Snow & Co.
Attorneys No. 761,116. Patented May 31, 1904.

UNITED STATES PATENT OFFICE.

CLARENCE G. WALLACE, OF KIOWA, COLORADO.

TRACE-CARRIER.

SPECIFICATION forming part of Letters Patent No. 761,116, dated May 31, 1904.

Application filed February 9, 1903. Serial No. 142,670. (No model.)

*To all whom it may concern:*

Be it known that I, CLARENCE G. WALLACE, a citizen of the United States, residing at Kiowa, in the county of Elbert and State of Colorado, have invented a new and useful Trace-Carrier, of which the following is a specification.

This invention relates to attachments for harness for supporting the traces when not in use, and has for its object to simplify the construction of devices of this character and decrease the expense; and the invention consists in certain novel features of the construction, as hereinafter shown and described, and specified in the claims.

In the drawings illustrative of the invention, in which corresponding parts are denoted by like designating characters, Figure 1 is a perspective view of the device complete. Fig. 2 is a front elevation, and Fig. 3 is a side elevation.

The improved device may be attached to any part of the harness, but will preferably be attached to the hip-straps near the points where the "breeching" members are attached when employed upon harness having the latter, or attached near the lower ends of the hip-straps in other forms of harness.

When employed upon harness not having hip-straps, the device will be connected to any other suitable or convenient portion of the harness; but as the hip-strap or other portions of the harness to which the device will be attached form no part of the present invention it is not shown in full, but its location merely indicated by dotted lines at 10 in Fig. 1.

It will be understood that one of the devices will be attached to each hip or other strap upon each side of each horse, so that each trace will be provided with its own independent support.

The improved device consists in a loop 11, formed, preferably, of a single piece of malleable metal having an eye 12 centrally at one end, the opposite end of the loop being bent to form a laterally-extended hook or bar 13, the sides of the loop being curved inwardly adjacent to the hooked portion, as shown at 14 15. The eye 12 provides means for the movable connection of the loop 11 to the harness, as by a buckle 16, of any approved form, but preferably with an eye 17 in one of its cross-bars engaging the eye 12 of the loop. The eye 12 will preferably be a "cold-shut" to facilitate connection to the buckle member. The hook portion 13, together with the inwardly-curving portions 14 15, is formed to receive the "cockeye" of the trace or one of the links of the trace-chains and may be varied in size to correspond to these portions of the harness, and when placed in position the device provides a convenient means for supporting the traces when not in use or when the team is being moved from place to place with the harness on. By this means the traces are supported in convenient position for the attendant, while at the same time securely held and prevented from displacement, no matter how violently the harness may be shaken about.

In attaching the trace to the support it will be necessary to turn the cockeye or chain-link into an unusual position, and they cannot be released unless they be again turned into the same unusual position, and as they will not assume such position voluntarily when in use, no matter how violently the harness may be agitated, the connection will not be accidentally severed or disconnected; but, while this is true, the parts may be very readily and quickly separated when desired.

By having the end of the loop 11 pivotally connected to the buckle 16 it permits said loop being swung outwardly and turned in a position to conveniently receive the cockeye of the trace or one of the links of the trace-chain.

The parts are very simple, easily applied to any harness, and will not detract from the appearance or otherwise disfigure it.

The loops 11 may be of any suitable material and of suitable strength and may be plated, japanned, or otherwise ornamented or protected.

Having thus described the invention, what I claim is—

1. As an article of manufacture, a trace-support consisting of a loop provided at one end with an eye and having its opposite sides contracted and bent laterally and thence outwardly at an angle to the general plane of the loop to form a horizontally-disposed supporting-bar.

2. As an article of manufacture, a trace-support consisting of a loop provided at one end with an eye and having its opposite sides contracted and bent laterally and thence outwardly and upwardly to form a horizontally-disposed supporting-bar, and a buckle member having an eye in one of its bars pivotally connected to the eye in the loop.

In testimony that I claim the foregoing as my own I have hereto affixed my signature in the presence of two witnesses.

CLARENCE G. WALLACE.

Witnesses:
 FRANK LONG,
 T. C. JAMES.